United States Patent [19]
Guimbellot

[11] 3,730,205
[45] May 1, 1973

[54] FUSIBLE SAFETY DEVICE

[76] Inventor: Bobby E. Guimbellot, 312 Briar Grove, Gretna, La.

[22] Filed: Aug. 11, 1971

[21] Appl. No.: 170,866

[52] U.S. Cl. ................................137/73, 137/75
[51] Int. Cl. .................................F16k 17/38
[58] Field of Search ............122/504.1, 504.3; 220/89 B; 137/67, 72–77

[56] References Cited

UNITED STATES PATENTS

| | | | |
|---|---|---|---|
| 1,771,716 | 7/1930 | Lovekin | 137/77 |
| 1,782,760 | 11/1930 | Lovekin | 137/75 |
| 2,484,940 | 10/1949 | Franzheim | 137/67 X |
| 3,618,627 | 11/1971 | Wagner | 137/73 |

*Primary Examiner*—Henry T. Klinksiek
*Assistant Examiner*—Richard Gerard
*Attorney*—Watson, Cole, Grindle & Watson

[57] ABSTRACT

A fusible safety device for use with a spring-loaded safety valve having an elongated valve stem mounted on a shiftable valve plug. The safety device comprises a hollow body adapted to be mounted on the casing of the valve. A fusible plug is mounted within the hollow body in a position to contact the valve stem and maintain the valve plug in a port clearing position. The fusible plug has an internal cavity extending longitudinally from one end thereof and terminating at a location spaced from the other end to present an end wall which contacts the valve stem. The fusible plug is constructed of a material which is capable of softening at an elevated temperature or in the presence of crude oil.

7 Claims, 1 Drawing Figure

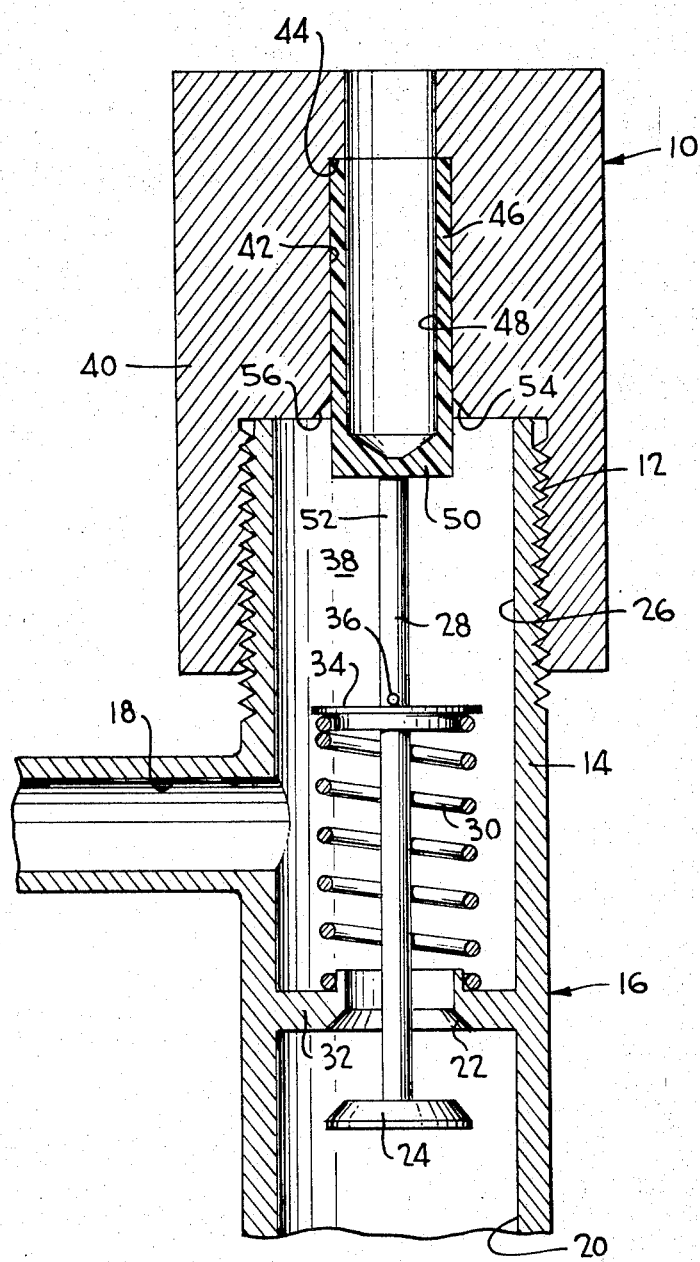

FUSIBLE SAFETY DEVICE

BACKGROUND OF THE INVENTION

1. Field of the Invention

The present invention relates to safety valves and particularly to fusible devices adapted for use with spring-loaded safety valves.

2. Description of the Prior Art

Presently known fusible safety devices are used to render valves inoperative in an open position and to permit closing of the valves in case of fire, etc. However, with such prior art fusible devices, such as, for example, the devices disclosed in U.S. Pat. Nos. 1,628,675 and 1,712,116, each of which includes a metallic disc fusible element, it has been difficult to provide a proper fusing point while still providing adequate pressure resisting characteristics. Fusing temperatures are often adjusted in these prior art devices by adjusting the proportions of components in the metallic alloy from which the disc is constructed. However, it is often the case that a metallic object having a sufficiently low melting temperature will not be strong enough to resist pressure forces which may be exerted during normal operations. Further, utilizing metallic fusible elements, assembly operations often require machining and other such metal working operations.

It is often necessary to install equipment and apparatus such as pressure control devices and the like, in oil wells. The equipment to be installed is often lowered on a wire line utilizing what are commonly known as wireline installation operations. During these operations, it is necessary to take measures to prevent accidental damage to the wireline which could occur, for example, if a valve were closed thereon. Accordingly, it is generally necessary to render normal safety equipment inoperative. However, this results in a period of time in which the well may be vulnerable to extreme danger from fire or over-pressure, or the like.

If known fusible safety devices were to be used in connection with oil wells, it would be possible to control the well by closing the same, but only in the event of fire. However, prior safety devices will not protect against massive oil spills if there is no fire. While this admittedly is a rare occurrence, since generally gushing oil will throw steel equipment around and cause sparks, which will in turn ignite the oil, it does occasionally happen that oil will gush from a broken well without fire. In such case, normal fusible safety devices utilizing metallic plugs will be of no assistance in controlling oil spills, and massive contamination of the ocean will result in the case of offshore operations.

SUMMARY OF THE INVENTION

The principle objective of the present invention is to avoid the shortcomings inherent in prior art fusible safety devices. In particular, it is a purpose of the invention to provide a fusible safety device wherein it is an extremely simple procedure to provide an exact combination of operational characteristics, e.g., fusible release point and pressure resisting characteristics, to the plug. It is another aim of the invention to provide a fusible safety device wherein assembly is simplified. A very important purpose of the invention is to provide a fusible safety device which not only is capable of controlling the escape of oil in case of fire, but which also is capable of closing the control valve after prolonged contact with crude oil even if no fire results.

The various objectives of the invention are achieved through the use of a safety device adapted for use with a spring-loaded safety valve comprising a casing having a pair of connections and an internal port which normally communicates the connections. The safety valve also includes a shiftable plug mounted within the casing for movement between port blocking and port clearing positions, and yieldable biasing means connected to the plug for yieldably urging the plug toward and into its port blocking position. An elongated valve stem is mounted on the plug for movement therewith. An opening is provided in the casing in general alignment with the port and the stem is disposed to extend generally along the path of movement of the plug, through the port and toward the opening in the casing. The safety device is comprised of a hollow body having an internal chamber, the body being adapted for mounting on the casing with its chamber in communication with the opening and with the valve stem of the valve extending into the chamber.

The safety device also includes an elongated fusible plug which has an internal cavity therein extending longitudinally from one of its ends and terminating at a location spaced from the other end to present an end wall. The body of the device has an elongated hole therein, communicating with the chamber. The hole is disposed to extend away from the stem in general alignment therewith, when the device is mounted on the casing. The fusible plug is received within the hole with its end wall disposed in contact with the stem to prevent movement of the valve plug into its port blocking position. Preferably, the fusible plug is constructed of a material capable of softening when its temperature is increased and/or after prolonged contact with crude oil products whereby it may collapse to permit movement of the valve plug into its port blocking position in the event of fire or massive escape of crude oil products through the port.

To facilitate assembly of the device, it is preferred that its hole and the fusible plug be circular in transverse, cross-sectional configuration. Also toward this end, it is preferred that the fusible plug be constructed of a compressible material and that the plug be initially slightly larger in diameter than the hole. Then, the body may be provided with a chamfered surface surrounding the hole at the end thereof where the plug will be inserted whereby to facilitate forcing of the plug into the hole.

DESCRIPTION OF THE DRAWING

The single FIGURE is an elevational, cross-sectional view of a safety device which embodies the principles of the present invention mounted on a spring-loaded safety valve.

DESCRIPTION OF THE PREFERRED EMBODIMENT

A safety valve which embodies the various concepts and principles of the present invention is illustrated in the drawing and is designated by the reference number 10. Safety device 10 is shown mounted, by means of screw threads 12, on the casing 14 of a spring-loaded safety valve 16. Casing 14 of valve 16 is provided with connections 18 and 20 which have been illustrated only very generally but the nature of which is well understood to those skilled in the art. Suffice it to say, that connections 18 and 20 may comprise screw threads, flanges or welding fittings.

Casing 14 includes an inner wall 32. An internal port 22 extends through wall 32 and normally intercommunicates connections 18 and 20. A shiftable plug 24 is mounted within casing 14 for movement in a manner well-known to those skilled in the art, between port blocking and port clearing positions. Manifestly, as illustrated, shiftable plug 24 is disposed in its port clearing position.

Casing 14 is provided with an opening 26 disposed in general alignment with port 22. An elongated valve stem 28 is mounted on shiftable plug 24 for movement therewith. Stem 28 extends along the path of movement of plug 24 through port 22 and toward opening 26. Yieldable biasing means in the nature of a helical spring 30 is provided for urging plug 24 toward its port blocking position. As illustrated, spring 30 acts between wall 32 in casing 14 and a retainer 34 held in place on stem 28 by a keeper pin 36. Manifestly, the manner in which spring 30 operates to urge plug 24 into its port blocking position is conventional and well-known to those skilled in the art.

Device 10 comprises a hollow body 40 defining an internal chamber 38 which communicates with opening 26 when body 40 is mounted on casing 14. Body 40 has a circular elongated hole 42 therein, which communicates with chamber 38 and extends away from stem 28. Means defining an annular shoulder 44 are disposed within hole 42 at a location spaced from cavity 38. As can be seen in the drawing, shoulder 44 faces cavity 38 and provides support for a generally circular elongated fusible plug 46 disposed in hole 42.

As can be seen, plug 46 has a central cavity 48 therein extending longitudinally thereof from its upper end and terminating at a location spaced from the other end of the plug to present an end wall 50. In this connection, plug 46 preferably extends outwardly from hole 42 and into chamber 38 so that end wall 50 contacts the upper end 52 of stem 28.

In accordance with the invention, plug 46 is constructed of a fusible material capable of softening at elevated temperatures. Preferably, the material from which plug 46 is constructed will also soften in the presence of certain components of crude oil. Also, plug 46 should be constructed of a compressible material to facilitate assembly of device 10. In this connection, body 40 of device 10 is provided with a chamfered surface 54 which extends around the end of hole 42 adjacent chamber 38. Surface 54 defines a frusto-conical space 56 communicating with chamber 38. Plug 46 is preferably initially slightly larger in diameter than hole 42 but can be driven into hole 42 by virtue of the fact that it is slightly compressible and it is guided by surface 54 during such assembly operation.

Body 40 of device 10 may be constructed of practically any material; however, aluminum generally is preferred in view of its lightness and ease of machining. In this regard, it should be noted that device 10 will normally be utilized under atmospheric conditions and out of contact with fluids in the well. When used in connection with oil wells, device 10 will most generally be used with offshore wells and above the surface of the water.

Plug 46, as setforth above, should preferably be constructed of a material capable of softening under the influence of temperature and/or in the presence of crude oil. Also, the material from which the plug 46 is constructed should also be slightly compressible.

Preferred materials are thermoplastic acrylic resins, such as polymers or copolymers of acrylic acid, methacrylic acid, esters of these acids and acrylonitrile. In particular, an acrylic resin produced by Cadillac Plastics and Chemicals Co., of Detroit, Mich. and designated by their number series 2101, has excellent properties for use in connection with this invention. Particularly, this preferred material has the following properties: Specific gravity of 1.17 – 1.21 and specific volume of 23.7 – 23.1 cu.in./lb. as determined by ASTM test method D–792; Tensile strength of 8,000 – 11,000 psi, per ASTM D–638 and D–651; Elongation of 2 – 7 percent, ASTM D–638; Modulus of elasticity of $3.5 – 5 \times 10^5$ psi, ASTM D–747; Compressive strength of 11,000 – 19,000 psi, ASTM D–695; Flexural strength of 12,000 – 17,000 psi, ASTM D–790; Impact strength 0.4 – 0.5 ft.lb./in., ASTM D–256; Rockwell hardness of M80 – M100, ASTM D–785; Thermal conductivity of $4 – 6 \times 10^4$, cal./sec./sq.cm./°C/cm., ASTM C–177; Thermal expansion of $5 – 9 \times 10^{-5}$ in./°C, ASTM D–696; Resistance to heat, continuous, 140° – 200°F.; Heating distortion, 150° – 210°F., ASTM D–648; Environmental water absorption, 0.3 – 0.4%/24 hrs./⅛ inch thickness, ASTM 570; Burning rate in accordance with ASTM D–635, slow; Effect of weak acids in accordance with ASTM D–543, practically nil; Effect of strong acids, ASTM D–543, attacked only by high concentrations of oxidizing acids; Effect of weak alkalis, ASTM D–543, practically nil; Effect of strong alkalis, ASTM D–543, attacked; Effect of organic solvents, ASTM D–543, soluble in ketones, esters, and aromatic chlorinated hydrocarbons.

Manifestly, it is neither required nor desirable that plugs such as plug 46 be immediately soluble in crude oil. Mere spattering of oil on the fusible plug should not substantially effect the same. What is desirable, in accordance with the invention, is that the plug be slightly softened in contact with crude oil such that over a period of several hours or maybe even after a day or so, the plug will eventually soften and collapse to close the valve and prevent further massive spillage.

The desirable collapse characteristics of the plug may be easily altered and adjusted by altering the physical dimensions of the plug. In this connection, a preferred form for plug 46 comprises a 1½ inches diameter acrylic rod which is 3⅜ inches long and has a 1 1/16 inches hole (cavity 48) drilled in its center approximately 2⅜ inches deep. This provides a cylindrical wall 7/32 inch thick and an end wall approximately 1 inch thick. The fusing and softening characteristics of the plug and its ability to withstand pressure may readily be altered by changing the diameter and depth of cavity 48. Often, as will be appreciated by those skilled in the art, the exact dimensions of the walls of the plug must be determined by a trial and error method, and they will depend on the conditions to which the plug will be subjected and the physical properties of the material from which it is made.

Assembly of the device is facilitated by the chamfered surface 54 and the shape of the plug 46. The hollow cylindrical configuration coupled with slight compressibility, permits the plug to be forced into hole 42 where it will remain by virtue of frictional forces exerted by the walls of the plug 46 against the internal surfaces of hole 42. Thus, plug 46 will remain in position within hole 42 with wall 50 contacting stem 28 to hold plug 24 in its port clearing position. Device 10 is capable of assembly at a location remote from valve 16. Thereafter, plug 46 will remain in place in hole 42 and device 10 can be mounted on a casing such as 14 without the need for special tools.

I claim:

1. A safety device for use with a spring-loaded safety valve comprising a casing having a pair of connections and an internal port normally intercommunicating said connections, a shiftable plug mounted within the casing for movement between port blocking and port clearing positions, yieldable biasing means connected to said plug and disposed for yieldably urging the latter toward and into its port blocking position, and an elongated valve stem mounted on the shiftable plug for movement therewith, there being an opening in said casing disposed in general alignment with said port, said stem being disposed to extend generally along the path of movement of the plug, through said port and toward said opening, said device comprising:

a hollow body having an internal chamber, said body being adapted for mounting on said casing with the chamber in communication with the opening and with the valve stem extending into the chamber; and an elongated fusible plug constructed of a resilient, thermoplastic resinous material and having a central cavity therein extending longitudinally thereof from one of its ends and terminating at a location spaced from its other end to present an end wall at said other end, said body having an elongated hole therein communicating with said chamber, said hole being disposed to extend away from said stem in general alignment therewith, when said device is mounted on the casing, said fusible plug being snugly received within said hole with its outer surface frictionally engaging the inner surfaces of the hole and with said end wall disposed to contact said stem and prevent movement of the valve plug into its port blocking position, said thermoplastic resinous material being capable of softening when its temperature is increased to a predetermined level whereby the fusible plug will collapse to permit movement of the valve plug into its port blocking position in the event of fire.

2. A safety device as set forth in claim 1 wherein said chamber is larger in cross-sectional area transversely of the plug than said hole, said fusible plug being disposed to extend outwardly of the hole with said end wall disposed within the chamber.

3. A safety device as set forth in claim 1 wherein said hole and said fusible plug are circular in transverse, cross-sectional configuration, said fusible plug being initially slightly larger in diameter than said hole.

4. A safety device as set forth in claim 2 wherein said hole is round and said body has a chamfered surface surrounding said hole at the end thereof adjacent said chamber, said surface presenting a frusto-conical space intercommunicating the interior of said hole and said chamber, said space increasing in diameter in a direction toward the chamber.

5. A safety device as set forth in claim 2 wherein said body has means presenting an annular shoulder facing said cavity and disposed within said hole at a location therein spaced from said cavity, said one end of the fusible plug contacting said shoulder.

6. A safety device as set forth in claim 1 wherein said thermoplastic material is capable of softening when contacted with crude oil products at ambient temperature whereby the fusible plug may collapse to permit movement of the valve plug into its port blocking position in the event of massive escape of crude oil products through said port.

7. A safety device for use with a spring-loaded safety valve comprising a casing having a pair of connections and an internal port normally intercommunicating said connections, a shiftable plug mounted within the casing for movement between port blocking and port clearing positions, yieldable biasing means connected to said plug and disposed for yieldably urging the latter toward and into its port blocking position, and an elongated valve stem mounted on the shiftable plug for movement therewith, there being an opening in said casing disposed in general alignment with said port, said stem being disposed to extend generally along the path of movement of the plug, through said port and toward said opening, said device comprising:

a hollow body having an internal chamber, said body being adapted for mounting on said casing with the chamber in communication with the opening and with the valve stem extending into the chamber, said body having an elongated hole therein communicating with said chamber, said hole being disposed to extend away from said stem in general alignment therewith when said device is mounted on the casing; and an elongated fusible plug constructed of a thermoplastic, resinous material received within said hole with one of its ends disposed to contact said stem to prevent movement of the valve plug into its port blocking position, said thermoplastic material being capable of softening when its temperature is increased to a predetermined level or when it is contacted with crude oil products at ambient temperature whereby the fusible plug may collapse to permit movement of the valve plug into its port blocking position in the event of fire or massive escape of crude oil products through said port.

* * * * *